United States Patent [19]
Blandin et al.

[11] Patent Number: 5,901,849
[45] Date of Patent: May 11, 1999

[54] U-SHAPED LIGHT-TIGHT STRUCTURE

[75] Inventors: Christophe L. Blandin; Didier Duc, both of Chalon Sur Saone Cedex, France

[73] Assignee: Eastman Kodak Company, Rochester, N.Y.

[21] Appl. No.: 08/947,116

[22] Filed: Oct. 8, 1997

[30] Foreign Application Priority Data

Nov. 15, 1996 [FR] France .................................. 96 14180

[51] Int. Cl.⁶ .............................. B65D 85/00; E06B 1/04
[52] U.S. Cl. .......................... 206/455; 49/504; 52/204.1; 352/72; 396/513; 396/535
[58] Field of Search .............................. 206/455; 352/72; 396/511, 513, 535, 536; 271/145; 52/455–458, 204.1; 49/504

[56] References Cited

U.S. PATENT DOCUMENTS

| | | | |
|---|---|---|---|
| 3,550,512 | 12/1970 | Lange | 396/535 |
| 3,736,051 | 5/1973 | Conner et al. | 352/72 |
| 3,852,780 | 12/1974 | Augustin, Jr. et al. | 396/511 |
| 4,223,494 | 9/1980 | Wendt | 49/504 X |
| 4,429,498 | 2/1984 | Pitt | 52/204.1 |
| 4,787,513 | 11/1988 | Auble et al. | |
| 4,993,698 | 2/1991 | Buelens et al. | 271/145 |
| 5,200,777 | 4/1993 | Zander | 396/513 X |
| 5,248,108 | 9/1993 | Zander | 396/513 X |
| 5,354,009 | 10/1994 | Buelens et al. | |
| 5,502,526 | 3/1996 | Katano | 396/535 |
| 5,680,202 | 10/1997 | Blandin et al. | 355/72 |
| 5,754,910 | 5/1998 | Balling | 396/536 |

FOREIGN PATENT DOCUMENTS

| | | |
|---|---|---|
| 282353 | 3/1993 | European Pat. Off. |
| 731376 | 9/1996 | European Pat. Off. |
| 1025151 | 1/1989 | Japan |

Primary Examiner—Bryon P. Gehman
Attorney, Agent, or Firm—Susan L. Parulski

[57] ABSTRACT

A closure of a container and more particularly a removable light-tight door. The door includes a plane surface and sides having two partitions and each orientated at 90° with respect to the plane surface. The outer partition of the edge is obtained by folding the wall and the inner partition consists of an attached folded panel with four elements, spot welded. The sides of the door form a U which comes to cooperate with the U formed by the sides of the container. Guide elements are provided in at least two corners of the door.

9 Claims, 3 Drawing Sheets

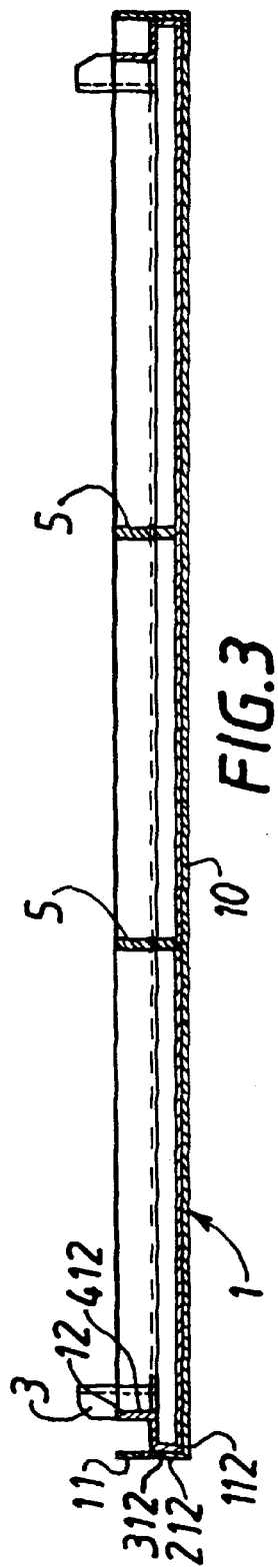
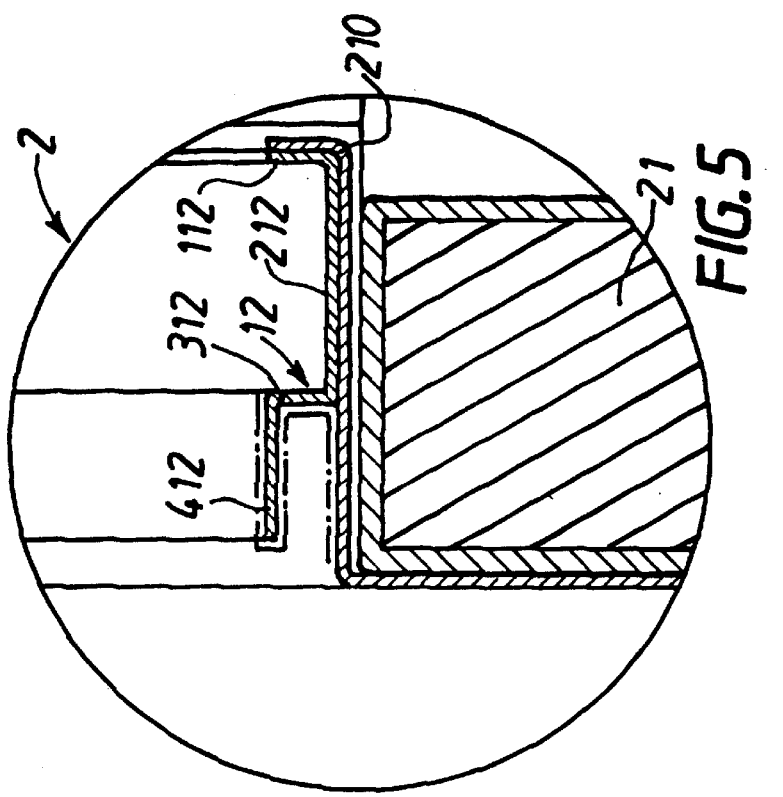
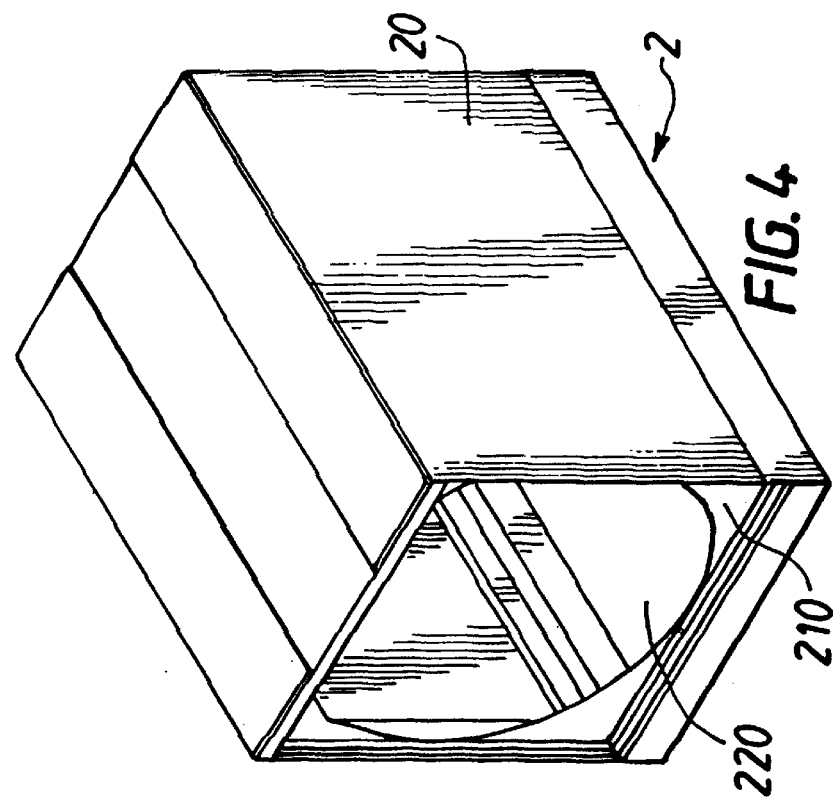

U-SHAPED LIGHT-TIGHT STRUCTURE

FIELD OF THE INVENTION

The invention concerns the closure of a container and more particularly the manufacture of a light-tight structure which can be used for the edge of a container and a removable light-tight door adapted to this container, this door and this container both being used in the transportation of photosensitive products in strip form. This type of container is particularly suited to the transportation of photosensitive products between photosensitive product manufacturing sites and processing laboratories using such products for effecting photographic printing, for example on paper.

BACKGROUND OF THE INVENTION

The containers currently used protecting products wound on tubes have followed the shape of the products to be packaged and are provided with round-shaped removable lids. It is customary practice in photography to obtain light-tightness by means of baffles. For example, the cooperation of two inverted Us overlapping with each other provides an excellent light trap. The drawback of this type of closure for a round-shaped lid is that, in order to obtain perfect light-tightness, it is necessary to produce a weld over the entire edge. However, continuous welds are relatively difficult to produce in order to obtain perfect light-tightness. New containers used for the transportation of photosensitive products in strip form are notably described in the application EP-A-0 731 376. The doors used in the production of these containers are rectangular and are hinged about a pin, vertical or horizontal. In photography, photosensitive products must be protected from light before they are used and the containers used are filled in the most complete darkness. The containers provided with this type of door have the drawback of not complying with certain safety constraints. It may in fact happen that such doors accidentally close all on their own or are closed by another operator, during use, which presents a significant drawback when in darkness. In addition, such doors do not comply with certain size constraints notably because of their opening by means of a hinge or again because of the size of the hinge. This is why it is preferable to use removable doors.

SUMMARY OF THE INVENTION

The object of the present invention is a U-shaped light-tight structure which is easy to produce and use.

Another object of the present invention is a removable door of simple and easy manufacture, which is perfectly light-tight.

Another object of the present invention is a container whose opening is provided with a U-shaped structure affording perfect light-tightness.

Another object of the invention is to obtain a door which can easily be used in darkness and whose shape enables it to be gripped easily.

The invention concerns a light-tight structure provided with a U-shaped groove, formed by a wall comprising an L shape on which is provided an attached folded partition, with four elements, each element perpendicular to the element which is contiguous thereto, three elements forming a first U and the fourth moving away from the U. The two elements of the first U which are not contiguous with the fourth element are disposed in the angle of the L. At least one of the elements is fixed to the wall comprising the L shape, so that said fourth element and the one which is contiguous therewith form a second U with the horizontal bar of the L.

The invention concerns more particularly a removable door delimited by straight-line segments which comprise a first wall, the essential feature of which forms a practically plane surface serving as a main part. The door is provided at its periphery with the light-tight structure described previously. The L shape is obtained by folding, at 90°, the wall serving as the main part.

The invention also concerns a container whose edges are provided with the light-tight structure described previously.

According to a preferred embodiment of the invention, the element of the structure forming the vertical bar of the first U which is not contiguous with the fourth element is extended over the entire surface of the door so as to have a double wall over the entire door.

The invention also concerns guidance means provided in at least two corners of the door, which facilitate its closure. Each guidance means consists of a volume whose generating lines are perpendicular to the plane surface of the door, and which extends beyond the structure.

According to a preferred embodiment of the invention, a guidance means consists of an element of rectangular parallelepiped shape overall, the length of which is perpendicular to the plane surface of the door. Two contiguous edges of the guidance means are fixed respectively to the two fourth elements of the partition forming the angle. The end of the guidance means extends beyond the structure. The two edges of the guidance means which are fixed respectively to the two fourth elements of the partition or oriented respectively in the same direction as said fourth elements of the partition to which they are fixed, over a significant first length of the projecting part, the remainder of the projecting part being provided with two re-entrant bevels.

According to another embodiment of the invention, each guidance means consists of a flat element of concave shape with respect to the corner of the door whose lateral edges are perpendicular to the plane surface of the door. The lateral edges of the flat element of concave shape are fixed respectively to the two fourth elements of the partition which form the angle. The end of the guidance means projects beyond the structure. Its lateral edges are oriented respectively in the same direction as the two fourth elements of the partition to which they are fixed over a first significant length of the projecting part. The remainder of the projecting part is provided with two re-entrant bevels.

Advantageously, the door includes a system for fixing to the container at the center of its plane surface.

Advantageously again, reinforcements are provided in order to reinforce the central part of the door. The reinforcements are, according to a preferred embodiment of the invention, formed by two bars welded on each side of the fixing system.

BRIEF DESCRIPTION OF THE DRAWINGS

In the description which follows, reference will be made to the drawings in which:

FIG. 3 is a transverse section of a door according to a preferred embodiment of the invention;

FIG. 4 depicts schematically the envelope of a container;

FIG. 5 is a transverse section of a structure according to the invention applied to a container;

DETAILED DESCRIPTION OF THE INVENTION

Figure 1:
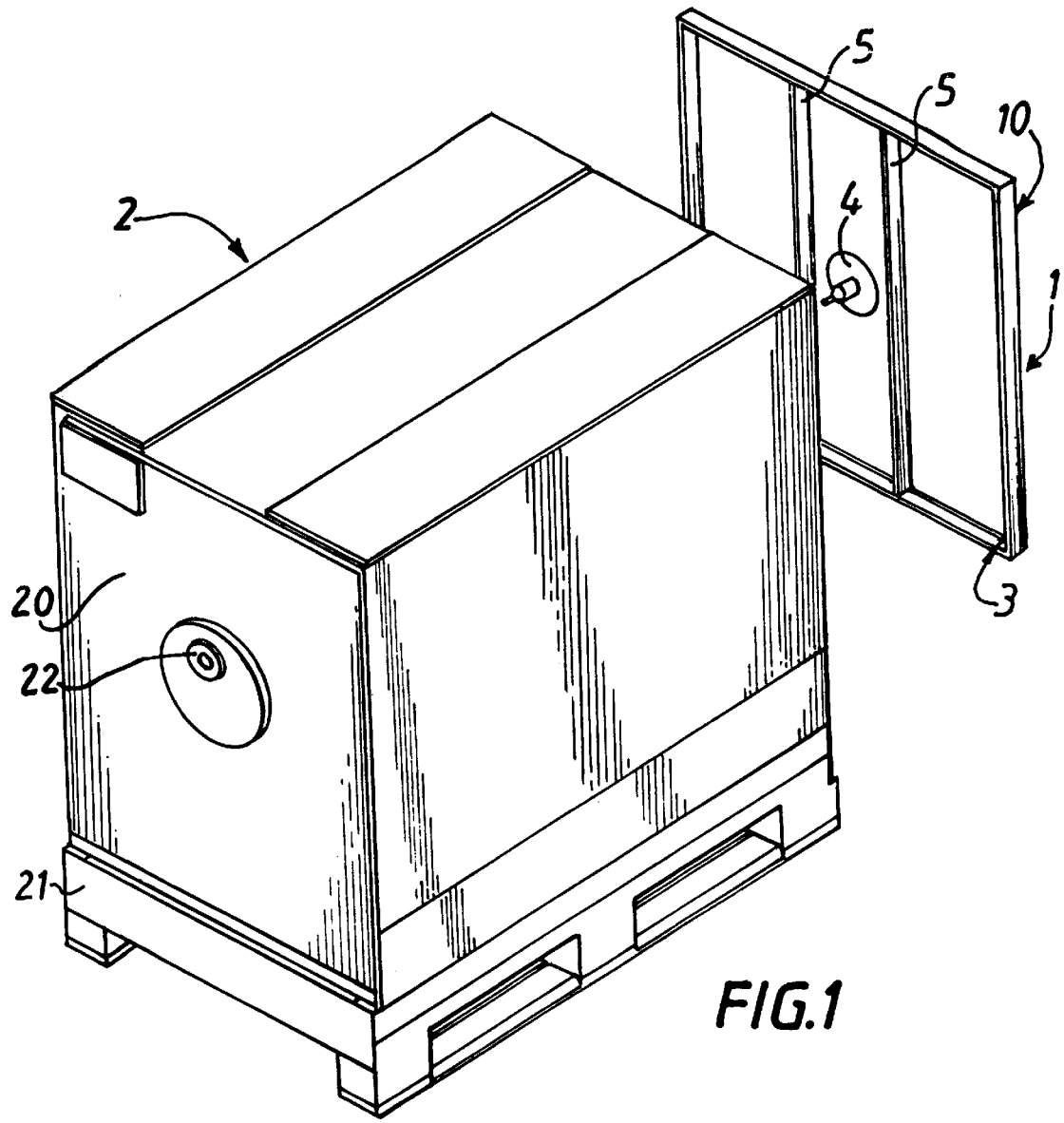
FIG. 1 depicts an overall view of a door according to the invention and of a container designed to be closed by the door.

FIG. 1 depicts a container 2 which can be closed by the door 1 according to the invention. The container 2 consists of a light-tight rectangular parallelepiped box 20. It also has a base 21 adapted to handling by lift truck. The container 2 also comprises a spindle 22, only one end of which is depicted in FIG. 1, designed to receive rolls of photosensitive products.

FIG. 1 also depicts the door 1 according to the invention, which comprises a first wall 10, the essential part of which forms a practically plane surface. The plane surface 10 is delimited by straight-line segments and forms the main part of the door. The door 1 is preferably of rectangular shape.

Figure 2:
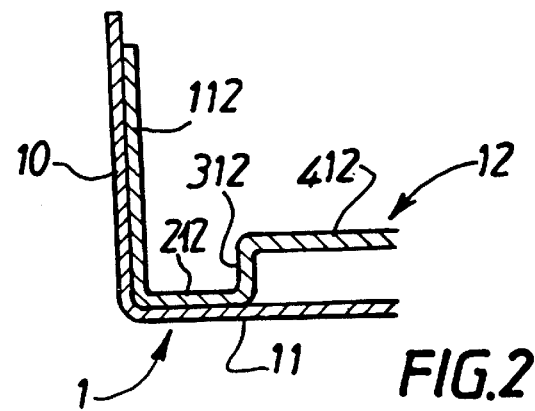
FIG. 2 is a detail of a transverse section of a light-tight structure according to the invention.

As emerges more clearly from FIG. 2, the edges of the door 1 are provided with two partitions 11 and 12 designed to be embedded in the container 2. The partitions 11 and 12 are each oriented at 90° with respect to the plane surface 10 of the door 1. The outer partition 11 in reality consists of the extension of the wall 10 of the door 1 which is bent at 90°. The inner partition 12 of the edge consists of an attached folded panel, with four elements 112-212-312-412, which is fixed to the wall 10 of the door 1, preferably spot welded; however, fixing by gluing or riveting can also be envisaged. Each of the four elements 112-212-312-412 is perpendicular to the element which is contiguous therewith. More particularly, three consecutive elements 112-212-312 form a first U and the fourth 412 moves away from said first U. The two elements 112 and 212 of the first U which are not contiguous with the fourth element 412 are fixed in the corner of the door 1. The fourth element 412 and that which is contiguous therewith 312 form a second U with the end of the outer partition 11 of the door 1.

According to the embodiment depicted in FIG. 3 and which is the preferred one, the element 112 of the inner partition 12 of the edge of the door 1 which forms a vertical bar of the first U and which is not contiguous with the fourth element 412, is extended over the entire surface of the door 1. The door 1 is thus formed by a double wall 10-112, the edges of which are folded. This reinforces the stiffness of the door 1 and the light-tightness.

A considerable advantage presented by the door 1 according to the invention is that it is produced from two plane surfaces folded so as to obtain optimum light-tightness when it closes the container, without its being necessary to effect continuous welds over the entire length of the edges of the door. The U shape of the edges of the door 1, obtained by folding, in fact makes it possible to arrest external light effectively. Only continuous welds in the corners are necessary, after folding, for light-tightness to be perfect. The inner wall 12 is only spot welded to the main wall 10 of the door 1. The folds made on the partition 12, notably between the elements 212 and 312 and the elements 312 and 412, have as small a radius as possible. It is preferably equal to half the thickness of the sheet used for the walls. This affords a maximum plane length of the element 312.

Light-tightness is all the more perfect as the container 2 which is closed by the door 1 is provided with the same light-tight structure provided with a U-shaped groove. FIG. 4 depicts schematically the envelope of the container 2, the spindle 22 and the base 21 have not been depicted in order to simplify the drawing. As can be seen in this figure, in order to ensure stiffness of the container, a rib 210 is disposed, a part 211 of which bears on the four faces of the container 2. The rib has an opening 220 enabling the rolls of paper to be loaded or unloaded into or from the interior of the container 2.

If reference is made to FIG. 5, the light-tight structure can be seen, which comprises a partition 12 formed by four elements 112-212-312-412 and similar to that provided on the door 1. The wall 210 comprises an L whose horizontal bar is extended, so as to cover the edge of the base 21 as far as the edge of the container 2 which is in contact with the base 21 is concerned, and is extended in the same way for the other edges of the container 2.

When the container 2 is closed, the second U of the door 1 formed by the elements 11-312-412 is embedded in the U provided on the edges of the container 2, the partition 11 of the door 1 coming inside the U of the container 2. The length of the elements forming the Us are provided so that the two Us cooperate perfectly, however, it is possible to provide a layer of elastic material on the element forming the horizontal bar of each U so that this element is not damaged by the vertical element of the U with which it cooperates.

Another advantage of the door 1 is that the distance between the two partitions 11 and 12 is defined by the arrangement of the four elements 112-212-312-412, this distance no longer needing to be defined when the internal partition 12 is fixed.

Another advantage of the door 1 is that the shape of its edges, notably the first U formed by the elements 112-212-312 of the inner door 12, constitutes a component for gripping the door. External handles are not necessary for handling the door, which avoids the risk, for example, of an operator leaving the door half open by forcing on the handles when the means of fixing the door to the container are fitted or attempts to move the entire container by means of such handles.

Since the door 1 is manipulated in the dark, guidance means 3 have been provided to facilitate notably the closure of said door 1. Two guidance means 3 are provided in the bottom corners of the door 1. The guidance means 3 consist of a volume whose generating lines are perpendicular to the plane surface 10 of the door 1, and which projects beyond the light-tight structure.

Figure 6:
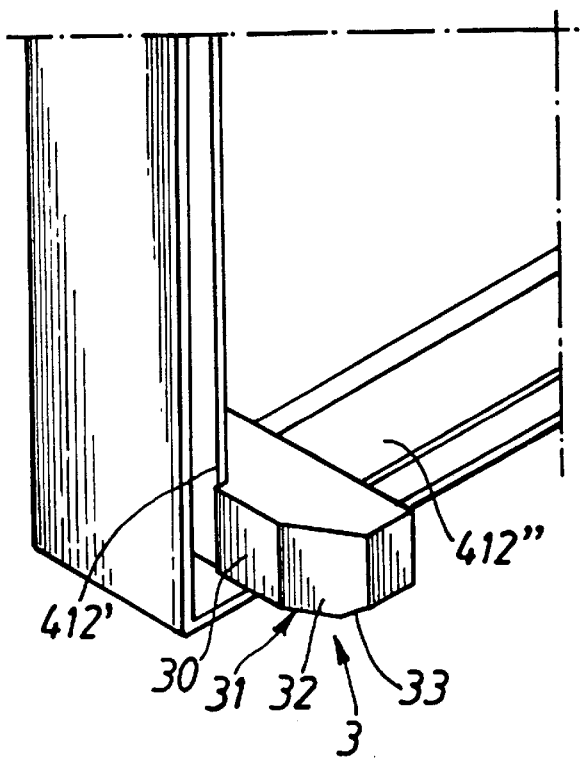
FIG. 6 depicts an embodiment of a guidance means for facilitating the closure of the door according to the invention.

If reference is made to FIG. 6, a guidance means consists of an element of rectangular parallelepiped shape overall, whose length is perpendicular to the plane surface of the door. Two of the sides 30 and 31 of the guidance means 3 are welded respectively to the two fourth elements 412' and 412" of the partition 12 forming the corner in which the guidance means 3 is fixed. The end of the parallelepiped projects beyond the light-tight structure over a sufficient distance to be able to rest on the inside of the container 2. The two sides 30 and 31 of the guidance means 3 which are welded respectively to the two fourth elements 412' and 412" of the partition 12, project beyond the light-tight structure whilst being oriented respectively in the same direction as the two fourth elements 412' and 412" of the partition 12 to which they are fixed, over a first significant length of the projecting part. The sides 30 and 31 of the guidance means 3 are provided, over the remainder of the projecting part, with re-entrant bevels 32 and 33.

Figure 7:
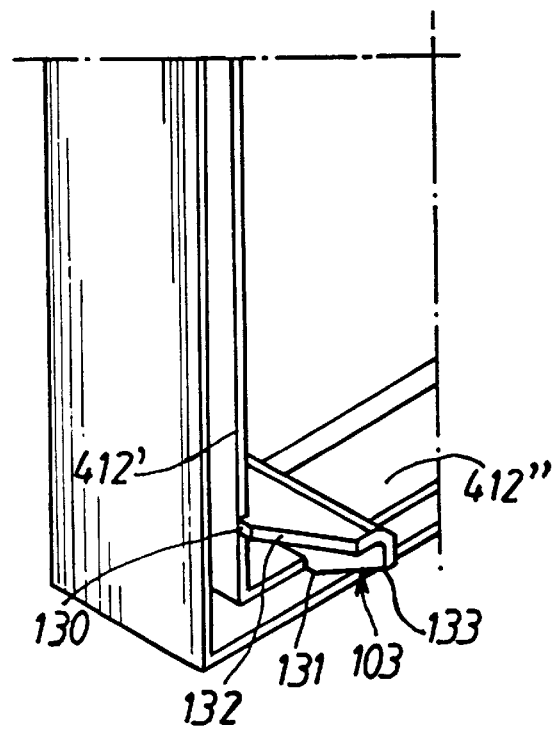
FIG. 7 depicts another embodiment of a guidance means according to the present invention.

According to another embodiment depicted in FIG. 7, the guidance consist of a flat element of concave shape 103 with respect to the corner whose lateral edges are perpendicular to the plane surface 10 of the door 1. The element of concave shape 103 connects the two fourth elements 412' and 412" of the partition 12 which form the corner in which the element of concave shape 103 is fixed and projects beyond the light-tight structure. The lateral edges 130 and 131 of the element of concave shape 103 are oriented respectively in the same direction as the two fourth elements 412' and 412" of the partition 12 to which they are fixed, over a first significant length of the projecting part. The lateral edges 130 and 131 of the element of concave shape 103 are provided, over the remainder of the projecting part, with re-entrant bevels 132 and 133. The element of concave shape 103 is preferably produced from a material which absorbs the contact pressure of the door 1 on the container 2 and which is sufficiently slippery. This material can be a hard plastic for example.

In the two embodiments of the guidance means 3, the beveled shape enables the guidance means 3 to be easily brought inside the container 2. In order to close the door 1, which takes place in the dark, the operator grips the door 1, slants it so as to present the bottom of the door 1 in contact with the container 2 and then places the guidance means 3 on the inner edge of the container 2. Then he straightens the door 1 and the U cooperates in a complementary manner with the shape of the U of the container. Thus a considerable advantage of such a removable door lies in its ease of closure by the operators.

If reference is made once again to FIG. 1, it can be seen that the door 1, in the closed position, is fixed to the container 2 by a fixing system with screws 4 situated at the center of the plane surface 10 of the door 1 as described in patent application EP-A-0 731 376.

Advantageously, reinforcements 5 are provided to reinforce the central part of the door 1. According to the invention it consists of two bars 50 and 51 welded on each side of the fixing system 4.

The invention has just been described with reference to preferred embodiments of the present invention. It is clear that variants can be envisaged, notably in the arrangement of the reinforcement, in the shape of the door or in its method of fixing.

What is claimed is:

1. A light-tight structure comprising:.
   a wall having two portions forming n L-shaped angle; and
   a folded partition attached to the wall, the folded partition including four elements, each of the four elements being contiguous with and perpendicular to another said element, three of the four elements form a first U-shape with the fourth element being directed away from the first U-shape, two of the elements of the first U-shape are not contiguous with the fourth element and are disposed in the L-shaped angle of the wall, at least one of the two elements of the first U-shape being fixed to the wall, the fourth element and the element contiguous thereto form a second U-shape with one portion of the wall.

2. A removable door comprising:
   a wall having a substantially plane surface, the wall being provided at its periphery with two portions having an L-shaped angle formed by folding the wall at 90°; and
   a folded partition attached to the wall, the folded partition including four elements, each of the four elements being contiguous with and perpendicular to another said element, three of the four elements form a first U-shape with the fourth element being directed away from the first U-shape, two of the elements of the first U-shape are not contiguous with the fourth element and are disposed in the L-shaped angle of the wall, at least one of the two elements of the first U-shape being fixed to the wall, the fourth element and the element contiguous thereto form a second U-shape with one portion of the wall.

3. The removable door according to claim 2 wherein one of the two elements of the first U-shape which are not contiguous with the fourth element is extended over the entire surface of the wall.

4. The removable door according to claim 2 wherein each of at least two corners of the door are provided with a guidance means for facilitating its closure, each guidance means consisting of a volume directed perpendicular to the plane surface.

5. The removable door according to claim 4 wherein each of the guidance means consists of an element of rectangular parallelepiped shape directed perpendicular to the plane surface, each guidance means having two contiguous sides fixed to the fourth element of the folded partition.

6. The removable door according to claim 5 wherein the two contiguous sides of each of the guidance means are oriented in substantially the same direction as the fourth element to which the two contiguous sides are fixed, one end of each of the guidance means being provided with two re-entrant bevels.

7. The removable door according to claim 4 wherein each of the guidance means consists of a flat element of concave shape with respect to the L-shaped angle, the lateral edges of the flat element are perpendicular to the plane surface and are fixed to the fourth element of the folded partition.

8. The removable door according to claim 7 wherein the lateral edges of the flat element of concave shape are oriented in substantially the same direction as the fourth element to which the lateral edges are fixed, one end of the flat element being provided with two re-entrant bevels.

9. A light-tight container define by a plurality of sides, at least one side including a wall having two portions forming an L-shaped angle and a folded partition attached to the wall, the folded partition including four elements, each of the four elements being contiguous with and perpendicular to another said element, three of the four elements form a first U-shape with the fourth element being directed away from the first U-shape, two of the elements of the first U-shape are not contiguous with the fourth element and are disposed in the L-shaped angle of the wall, at least one of the two elements of the first U-shape being fixed to the wall, the fourth element and the element cotiguous thereto form a second U-shape with one portion of the wall.

* * * * *